(12) United States Patent
Ogiwara et al.

(10) Patent No.: US 6,840,043 B2
(45) Date of Patent: Jan. 11, 2005

(54) MASTER CYLINDER

(75) Inventors: Takato Ogiwara, Minami Alps (JP); Naganori Koshimizu, Yamanashi-ken (JP)

(73) Assignee: Tokico Ltd. (JP)

( * ) Notice: Subject to any disclaimer, the term of this patent is extended or adjusted under 35 U.S.C. 154(b) by 86 days.

(21) Appl. No.: 10/377,394

(22) Filed: Feb. 27, 2003

(65) Prior Publication Data

US 2003/0213241 A1 Nov. 20, 2003

(30) Foreign Application Priority Data

Feb. 28, 2002 (JP) ........................................ 2002-054454

(51) Int. Cl.$^7$ ................................................ F15B 7/04
(52) U.S. Cl. ............................................................ 60/578
(58) Field of Search ................................... 60/578, 562

(56) References Cited

U.S. PATENT DOCUMENTS 5,557,935 A 9/1996 Ganzel
6,578,360 B2 * 6/2003 Mouri et al. .................. 60/562
6,698,202 B2 * 3/2004 Ogiwara et al. .............. 60/578

* cited by examiner

Primary Examiner—Edward K. Look
Assistant Examiner—Igor Kershteyn
(74) Attorney, Agent, or Firm—Brinks Hofer Gilson & Lione

(57) ABSTRACT

A master cylinder that can sufficiently compensate for an ineffective fluid amount at an initial stage of a stroke, even at a time of sudden braking in a case where a hydraulic control unit is disposed between the master cylinder and a brake device, is provided. The master cylinder includes a control valve that releases hydraulic pressure in a large diameter pressurizing chamber to a reservoir side when the hydraulic pressure in the large diameter pressurizing chamber reaches a fluid-release pressure corresponding to hydraulic pressure introduced via a branched flow path that branches from a communication flow path that connects a hydraulic control unit and a small diameter hydraulic chamber. A restrictor is disposed in the branched flow path for introducing the hydraulic pressure to the control valve.

4 Claims, 3 Drawing Sheets ly, the fluid pressure of the hydraulic chamber and the brake fluid pressure of the brake device side reliably rise, and the ineffective fluid amount at the initial stage of the stroke can be reliably compensated for.

MASTER CYLINDER

BACKGROUND OF THE INVENTION

1. Field of the Invention

The present invention relates to a master cylinder that supplies brake fluid to a brake device or the like in an automobile.

2. Description of the Related Art

As described in the microfilm of Japanese Utility Model Application No. 55-152602 (Japanese Utility Model Application Laid-Open Publication No. 57-73248), there is a conventional master cylinder (fast fill master cylinder) with which it is possible to compensate for an ineffective fluid amount at an initial stage of a stroke by so-called fast filling, in which a large amount of brake fluid is supplied at an initial stage of actuation when the brake fluid is supplied to a brake device such as a disk brake or a drum brake, and, as a result, shorten the pedal stroke.

The fast fill master cylinder is disposed with: a stepped cylinder that includes a large diameter cylinder portion and a small diameter cylinder portion; a stepped piston that includes a large diameter piston portion, which is slidably inserted into the large diameter cylinder portion of the stepped cylinder, and a small diameter piston portion, which is slidably inserted into the small diameter cylinder portion of the stepped cylinder; and a cup seal (open/close check portion) that partitions the inside of the stepped cylinder into a large diameter pressurizing chamber on the large diameter piston portion side and a small diameter hydraulic chamber on the small diameter piston portion side and permits flow of brake fluid only from the large diameter pressurizing chamber side to the small diameter hydraulic chamber side.

When the stepped piston slides toward the small diameter hydraulic chamber side by input from a brake pedal, the volume of the large diameter pressurizing chamber is reduced by the sliding of the stepped piston toward the small diameter hydraulic chamber side, whereby the open/close check portion is opened and the fluid is supplied from the large diameter pressurizing chamber side to the small diameter hydraulic chamber side. Thus, fast filling is conducted.

The fast fill master cylinder is disposed with a relief valve that allows brake fluid to escape from the large diameter pressurizing chamber to a reservoir when the pressure inside the large diameter pressurizing chamber becomes equal to or higher than a predetermined value, and a notch is disposed at the relief valve so that the large diameter pressurizing chamber always communicates with the reservoir. The fluid is supplied from the reservoir to the large diameter pressurizing chamber through a communication path that has an extremely small diameter due to the notch.

In recent years, a hydraulic control unit has been disposed on a communication flow path that connects a small diameter hydraulic chamber of the master cylinder and the brake device, in order to control brake fluid pressure of the master cylinder corresponding to the depression of the brake pedal and to transmit the brake fluid pressure to the brake device. An example of such a hydraulic control unit is an ABS unit that determines whether or not the wheels have a tendency to slip during braking and, when the wheels do have a tendency to slip, reduces pressure to a hydraulic pressure that avoids the tendency to slip and transmits the brake fluid pressure to the brake device.

A restrictor is disposed inside the hydraulic control unit. When a restrictor is disposed inside the hydraulic control unit, there are no effects of the restrictor at the time of ordinary braking when the speed of pressurization is low. However, because hydraulic pressures of a communication flow path, which connects the hydraulic control unit and the small diameter hydraulic chamber, and a branched flow path, which branches from the communication flow path, suddenly rise due to the restrictor and reach a set valve-opening pressure before the brake fluid is sufficiently supplied to the brake device, even if an open/close check portion is opened and fluid is about to be supplied from the large diameter pressurizing chamber to the small diameter hydraulic chamber side and to the brake device side in order to compensate for the ineffective fluid amount during the initial stage of the stroke at the time of sudden braking, when the speed of pressurization is high, the hydraulic pressure of the large diameter pressurizing chamber is released to the reservoir side before the brake fluid is sufficiently supplied to the brake device side. Thus, there has been the problem that it has been impossible to compensate for the ineffective fluid amount during the initial stage of the stroke. As a result, the pedal stroke extends, and pedal feel is worsened.

SUMMARY OF THE INVENTION

It is an object of the invention to provide a master cylinder that can sufficiently compensate for an ineffective fluid amount at an initial stage of a stroke, even at a time of sudden braking in a case where a hydraulic control unit is disposed between the master cylinder and a brake device.

In order to achieve the above object, a master cylinder of an embodiment of the invention comprises: a first cylinder portion and a second cylinder portion; a first piston portion that is slidably inserted into the first cylinder portion; a second piston portion that is slidably inserted into the second cylinder portion; a pressurizing chamber that is caused to expand and contract by the sliding of the first piston portion; a hydraulic chamber that is caused to expand and contract by the sliding of the second piston portion and communicates with a brake device via a hydraulic control unit; an open/close check portion that partitions the pressurizing chamber and the hydraulic chamber and permits flow of brake fluid only from the pressurizing chamber side to the hydraulic chamber side; a first flow path that communicates the pressurizing chamber and a reservoir; a control valve that includes a pilot chamber and switches the first flow path from a blocked state to a communicable state when pressure inside the pilot chamber reaches a predetermined fluid-release pressure; a second flow path that communicates the pilot chamber and the hydraulic chamber; and a restrictor disposed in the second flow path.

Thus, at a time of sudden braking, when the check/open close portion is opened and the fluid is about to be supplied from the pressurizing chamber side to the hydraulic chamber side in order to compensate for an ineffective fluid amount during an initial stage of a stroke, even if the hydraulic pressures in the communication flow path, which connects the hydraulic control unit and the hydraulic chamber, and the second flow path suddenly rise due to a restrictor of the hydraulic control unit, the restrictor disposed in the second flow path prevents the hydraulic pressure in the pilot chamber from suddenly rising and prevents the control valve from opening.

The master cylinder of the invention is also characterized in that the restrictor of the second flow path has a flow path cross-sectional area having circulation resistance that is the same as circulation resistance inside the hydraulic control unit.

In this manner, because the restrictor of the second flow path has a flow path cross-sectional area having circulation resistance that is the same as that of the restrictor disposed within the hydraulic control unit, changes in the pressure of the pilot chamber and the pressure of the brake device become substantially identical, and effects resulting from the manner of depression of the brake pedal of the opening of the control valve are made smaller.

A master cylinder of another embodiment of the invention comprises: a first cylinder portion and a second cylinder portion; a first piston portion that is slidably inserted into the first cylinder portion; a second piston portion that is slidably inserted into the second cylinder portion; a pressurizing chamber that is caused to expand and contract by the sliding of the first piston portion; a hydraulic chamber that is caused to expand and contract by the sliding of the second piston portion and communicates with a brake device via a hydraulic control unit; an open/close check portion that partitions the pressurizing chamber and the hydraulic chamber and permits flow of brake fluid only from the pressurizing chamber to the hydraulic chamber; a first flow path that communicates the pressurizing chamber and a reservoir; a control valve that includes a pilot chamber and switches the first flow path from a blocked state to a communicable state when pressures inside the pilot chamber and the first flow path reach a predetermined fluid-release pressure; a second flow path that communicates the pilot chamber and the hydraulic chamber; and a restrictor disposed in the first flow path upstream of the control valve.

Thus, at a time of sudden braking, when the check/open close portion is opened and the fluid is about to be supplied from the pressurizing chamber side to the hydraulic chamber side in order to compensate for an ineffective fluid amount during an initial stage of a stroke, even if the hydraulic pressures in the communication flow path, which connects the hydraulic control unit and the hydraulic chamber, and the second flow path suddenly rise due to a restrictor of the hydraulic control unit, the restrictor disposed in the first flow path upstream of the control valve prevents the pressure in the first flow path from suddenly rising and prevents the control valve from opening.

The master cylinder of the other embodiment of the invention can also be characterized in that the restrictor disposed in the first flow path upstream of the control valve has a flow path cross-sectional area having circulation resistance that is the same as circulation resistance inside the hydraulic control unit.

In this manner, because the restrictor disposed in the first flow path upstream of the control valve has a flow path cross-sectional area having circulation resistance that is the same as that of the restrictor disposed within the hydraulic control unit, changes in the pressure of the pilot chamber and the pressure of the brake device become substantially identical, and effects resulting from the manner of depression of the brake pedal of the opening of the control valve are made smaller.

DESCRIPTION OF THE PREFERRED EMBODIMENTS

Figure 1:
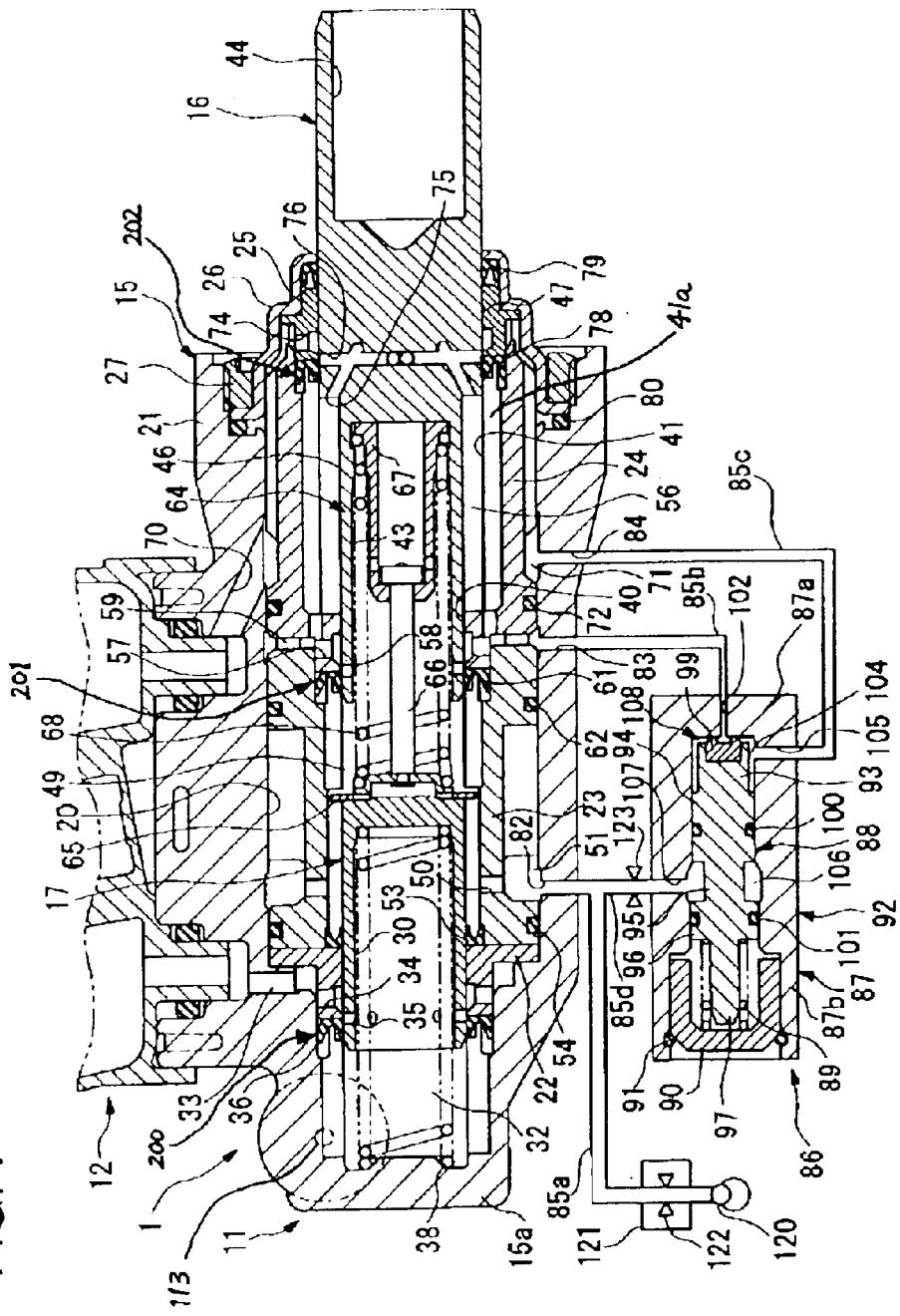
FIG. 1 is a side cross-sectional view showing the structure of a master cylinder of an embodiment of the invention.

FIG. 1 shows a master cylinder of a first embodiment. In FIG. 1, reference numeral 11 designates a master cylinder main body that generates brake fluid pressure in accordance with input from a brake pedal introduced via a booster (not shown), and reference numeral 12 designates a reservoir that is attached to an upper portion of the master cylinder main body 11 and stores brake fluid that is charged to and discharged from the master cylinder main body 11.

The master cylinder main body 11 includes a stepped cylinder 15 having a shape of a substantial bottomed cylinder along a horizontal direction, a primary piston (stepped piston) 16 that is slidably fitted to an opening portion side (right side in FIG. 1) of the stepped cylinder 15, and a secondary piston 17 that is slidably fitted to the stepped cylinder 15 closer to a bottom portion 15a side (left side in FIG. 1), which is described later, with respect to the primary piston 16.

The stepped cylinder 15 includes: a first member 21, which has the shape of a bottomed cylinder formed with the bottom portion 15a of the stepped cylinder 15 and a hole portion 20 along the horizontal direction; a second member 22, a third member 23, a fourth member 24, and a fifth member 25, which are substantially cylindrical and successively fitted to the inside of the hole portion 20 of the first member 21 from the bottom portion 15a side; a sixth member 26, which is disposed so as to cover the fifth member 25 at a side thereof opposite from the bottom portion 15a of the fifth member 25; and a seventh member 27, which is disposed at a side opposite from the bottom portion 15a of the sixth member 26 and screwed into the first member 21 to thereby hold the second member 22 through the sixth member 26 inside the first member 21.

The secondary piston 17 is slidably fitted to the inside of the second member 22. The secondary piston 17 has the shape of a bottomed cylinder, with a hole portion 30 being formed in one end thereof, and is fitted to the second member 22 such that the hole portion 30 faces the bottom portion 15a of the first member 21.

Here, a portion surrounded by the bottom portion 15a side of the first member 21 and the bottom portion 15a side (i.e., the hole portion 30 side) of the secondary piston 17 constitutes a secondary side small diameter hydraulic chamber 32.

A port 34 is formed in the second member 22. One end of the port 34 opens to an inner peripheral surface of the second member 22 in the direction of the diameter thereof, and another end of the port 34 constantly communicates with the reservoir 12 via a flow path 33 of the first member 21. A relief port 35, which can communicate with the port 34 and the secondary side small diameter hydraulic chamber 32, is formed in the secondary piston 17.

A cup seal 36, which can block communication between the secondary side small diameter hydraulic chamber 32 and the port 34, is disposed between the second member 22 and the first member 21. When the hydraulic pressure of the secondary side small diameter hydraulic chamber 32 is equal to or higher than that of the reservoir 12 side, the cup seal 36 blocks communication therebetween. When the hydraulic pressure of the secondary side small diameter hydraulic chamber 32 is lower than that of the reservoir 12 side, the cup seal 36 allows communication therebetween to enable supply of the brake fluid.

A secondary piston spring 38 is disposed between the hole portion 30 of the secondary piston 17 and the bottom portion 15a of the first member 21. The secondary piston spring 38 determines the interval therebetween in an initial state in which there is no input from an unillustrated brake pedal side (right side in FIG. 1) (positions of the respective portions at this time will be referred to below as initial positions). When the respective portions are disposed at the initial positions, the secondary piston 17 allows the relief port 35 to communicate with the port 34 and, as a result, allows the secondary side small diameter hydraulic chamber 32 to communicate with the reservoir 12.

When the secondary piston 17 moves from this state toward the bottom portion 15a side of the first member 21, the relief port 35 of the secondary piston 17 is closed off by the cup seal 36 and communication with the port 34 is blocked in a state in which the hydraulic pressure of the secondary side small diameter hydraulic chamber 32 is equal to or higher than that of the reservoir 12 side. As a result, communication between the secondary side small diameter hydraulic chamber 32 and the reservoir 12 is blocked, whereby the secondary piston 17 moves further toward the bottom portion 15a side so that the brake fluid is supplied from the secondary side small diameter hydraulic chamber 32 to a brake device or a traction control apparatus (not shown) via a secondary side delivery hole 113.

Here, the secondary piston 17, which includes the relief port 35, and the cup seal 36 constitute a secondary side cut-off portion 200 that is closed by the secondary piston 17 sliding toward the secondary side small diameter hydraulic chamber 32 side.

The fourth member 24 has a stepped configuration that includes a small diameter cylinder portion 40 (a second cylinder portion) at the bottom portion 15a side of the first member 21 and a large diameter cylinder portion 41 (a first cylinder portion), which has a diameter that is larger than that of the small diameter cylinder portion 40, at a side opposite from the bottom portion 15a of the first member 21. The primary piston 16 is slidably fitted to the inside of the small diameter cylinder portion 40. The large diameter cylinder portion 41 is disposed with a plurality of axial-direction grooves 41a that are separated by intervals in a circumferential direction.

A hole portion 43, which is disposed so as to face the secondary piston 17, is formed in one end of the primary piston 16, and a hole portion 44, into which a rod of an unillustrated booster is inserted, is formed in another end of the primary piston 16. The primary piston 16 includes, an one end thereof, a small diameter piston portion 46 (a second piston portion) that is slidably inserted into the small diameter cylinder portion 40 of the fourth member 24, and also includes, at the other end thereof, a large diameter piston portion 47 (a first piston portion) that is slidably inserted into the large diameter cylinder portion 41 of the fourth member 24. The large diameter piston portion 47 is also slidably inserted into the fifth member 25.

A portion surrounded by a side of the secondary piston 17 opposite to the bottom portion 15a, by the small diameter piston portion 46 side (i.e., the hole portion 43 side) of the primary piston 16, and by the third member 23, constitutes a primary side small diameter hydraulic chamber (hydraulic chamber) 49.

A small diameter hydraulic chamber communication flow path 51, which always communicates with the primary side small diameter hydraulic chamber 49 via a hole portion 50, is formed between the third member 23 and the first member 21.

A communication flow path of the invention is constituted by the hole portion 50 and the small diameter hydraulic chamber communication flow path 51.

A cup seal 53, which blocks communication between the primary side small diameter hydraulic chamber 49 and the flow path 33 and the port 34, is disposed between the second member 22 and the third member 23 and the secondary piston 17.

An O-ring 54, which always blocks communication between the small diameter hydraulic chamber communication flow path 51 and the flow path 33 and the port 34, is disposed between the first member 21 and the third member 23 closer to the bottom portion 15a side than the small diameter hydraulic chamber communication flow path 51.

A portion surrounded by the primary piston 16 and the large diameter cylinder portion 41 side of the fourth member 24 constitutes a large diameter pressurizing chamber 56 (pressurizing chamber) at the large diameter piston portion 47 side.

A port 57 is formed in the fourth member 24. One end of the port 57 opens to an inner peripheral surface of the small diameter cylinder portion 40 in the direction of the diameter thereof, and another end of the port 57 always communicates with the large diameter pressurizing chamber 56. A relief port 58, which enables communication between the port 57 and the hole portion 43 (i.e., the primary side small diameter hydraulic chamber 49), is formed in the small diameter piston portion 46 of the primary piston 16. It should be noted that the port 57 also always communicates with a pressurizing chamber communication flow path 59 between the third member 23 and the fourth member 24.

A cup seal (open/close check portion) 61, which can block communication between the primary side small diameter hydraulic chamber 49 and the large diameter pressurizing chamber 56 side, is disposed between the third member 23 and the fourth member 24 and the small diameter piston portion 46 of the primary piston 16. When the hydraulic pressure of the primary side small diameter hydraulic chamber 49 is equal to or higher than that of the large diameter pressurizing chamber 56, the cup seal 61 blocks communication therebetween. Conversely, when the hydraulic pressure of the large diameter pressurizing chamber 56 is higher than that of the primary side small diameter hydraulic chamber 49, the cup seal 61 allows communication therebetween. In other words, the cup seal 61 partitions the inside of the stepped cylinder 15 into the large diameter pressurizing chamber 56 at the large diameter piston portion 47 side and the primary side small diameter hydraulic chamber 49 at the small diameter piston portion 46 side, and permits flow of the brake fluid only from the large diameter pressurizing chamber 56 side to the primary small diameter hydraulic chamber 49 side.

An O-ring 62, which always blocks communication between the small diameter hydraulic chamber communication flow path 51 and the side of the large diameter pressurizing chamber 56, is disposed between the first member 21 and the third member 23 at a side thereof further opposite from the bottom portion 15a than the small diameter hydraulic chamber communication flow path 51.

A primary initial position determining mechanism 64, which determines an interval between the secondary piston 17 and the primary piston 16 in the initial state in which there is no input from an unillustrated brake pedal side (right side in FIG. 1), is disposed between the secondary piston 17 and the primary piston 16. The primary initial position determining mechanism 64 includes a contact member 65 that contacts the secondary piston 17, a shaft member 66 that is fixed to the contact member 65 so as to extend toward the primary piston 16, a contact member 67 that movably holds the shaft member 66 in a predetermined range and contacts a bottom of the hole portion 43 of the primary piston 16, and a primary piston spring 68 that urges the contact members 65 and 67 in opposite directions.

When the primary initial position determining mechanism 64 positions the contact members 65 and 67 at remotest positions prescribed by the shaft member 66 due to an urging force of the primary piston spring 68, the primary piston 16 is disposed at its initial position, the relief port 58 is made to communicate with the port 57, and the primary side small diameter hydraulic chamber 49 is made to communicate with the large diameter pressurizing chamber 56.

When the primary piston 16 moves from its initial position toward the bottom portion 15a side, the relief port 58 of the primary piston 16 is closed off by the cup seal 61, communication with the port 57 is blocked, and communication between the primary side small diameter hydraulic chamber 49 and the large diameter pressurizing chamber 56 via the relief port 58 is blocked, in a case where the hydraulic pressure inside the primary side small diameter hydraulic chamber 49 is equal to or higher than the hydraulic pressure inside the large diameter pressurizing chamber 56. When the primary piston 16 moves from this state further toward the bottom portion 15a side, the brake fluid is supplied from the primary side small diameter hydraulic chamber 49 to a brake device or a traction control device. It should be noted that, even in a state in which the relief port 58 is closed off, the brake fluid of the large diameter pressurizing chamber 56 flows to the primary side small diameter hydraulic chamber 49 via the cup seal 61 when the hydraulic pressure of the large diameter pressurizing chamber 56 is equal to or higher than that of the primary side small diameter hydraulic chamber 49.

The small diameter piston portion 46, which includes the relief port 58, and the cup seal 61 constitute a small diameter hydraulic chamber side blocking portion 201, which is closed off by the primary piston 16 sliding toward the primary side small diameter hydraulic chamber 49 side to thereby block communication between the large diameter pressurizing chamber 56 and the primary side small diameter hydraulic chamber 49.

The fourth member 24 forms an atmospheric pressure fluid supply chamber 71 that always communicates with the reservoir 12 via a flow path 70 of the first member 21 between the fourth member 24 and the first member 21. An O-ring 72, which always blocks communication between the large diameter side pressurizing chamber 56 and the fluid supply chamber 71, is disposed between the first member 21 and the fourth member 24 at a side thereof that is closer to the bottom portion 15a side than the fluid supply member 71.

A port 74 is formed in the fifth member 25. One end of the port 74 opens to an inner peripheral surface in the direction of the diameter thereof, and another end of the port 74 always communicates with the fluid supply chamber 71. A relief port 76 is formed in the primary piston 16. One end of the relief port 76 is communicable with the port 74 (i.e., the fluid supply chamber 71) by being opened to an outer peripheral surface of the large diameter piston portion 47 in the direction of the diameter thereof. Another end of the relief port 76 always communicates with a stepped portion 75 at a boundary between the large diameter piston portion 47 and the small diameter piston portion 46 (i.e., the large diameter pressurizing chamber 56).

A cup seal 78, which can block communication between the large diameter pressurizing chamber 56 and the fluid supply chamber 71, is disposed between the fourth member 24 and the fifth member 25 and the large diameter piston portion 47 of the primary piston 16. When the hydraulic pressure in the large diameter pressurizing chamber 56 is equal to or higher than that of the fluid supply chamber 71, the cup seal 78 blocks communication therebetween. Conversely, when the hydraulic pressure of the fluid supply chamber 71 is higher than the hydraulic pressure of the large diameter pressurizing chamber 56, the cup seal 78 supplies the fluid by allowing communication therebetween.

When the primary piston 16 is at its initial position, it allows the relief port 76 to communicate with the port 74, and allows the large diameter pressurizing chamber 56 to communicate with the fluid supply chamber 71. When the primary piston 16 slides from its initial position toward the bottom portion 15a side (i.e., toward the primary side small diameter hydraulic chamber 49), the relief port 76 is closed off by the cup seal 78 to block communication with the port 74, and communication between the large diameter pressurizing chamber 56 and the fluid supply chamber 71 via the relief port 76 is blocked when the hydraulic pressure in the large diameter pressurizing chamber 56 is equal to or higher than that of the fluid supply chamber 71. When the primary piston 16 slides further toward the primary side small diameter hydraulic chamber 49 side, the primary piston 16 raises the hydraulic pressure of the large diameter pressurizing chamber 56 by the large diameter piston portion 47 reducing the volume of the large diameter pressurizing chamber 56, opens the cup seal 61 disposed between the large diameter pressurizing chamber 56 and the primary side small diameter hydraulic chamber 49, and allows the fluid to be supplied from the large diameter pressurizing chamber 56 side to the primary side small diameter hydraulic chamber 49.

The large diameter piston portion 47, which includes the relief port 76, and the cup seal 78 constitute a large diameter pressurizing chamber side blocking portion 202, which is closed off by the primary piston 16 sliding toward the primary side small diameter hydraulic chamber 49 side to thereby block communication between the large diameter pressurizing chamber 56 and the fluid supply chamber 71 (i.e., the reservoir 12).

A cup seal 79 is disposed between the fifth member 25 and the sixth member 26 and the large diameter piston portion 47 of the primary piston 16, and an O-ring 80 is disposed between the first member 21 and the sixth member 26.

It should be noted that the diameters of all of the relief ports 35, 58 and 76 are Ø2 (mm), and are thus made large, and that the relief ports 35, 58 and 76 are respectively disposed in several places.

Also, a tapered surface that is described in Japanese Patent Application No. Hei 10-294502, which the present applicant previously filed, is formed at a peripheral portion that contacts the cup seal 36 near the relief port 35 of the secondary piston 17 and at a peripheral portion that contacts the cup seal 78 near the relief port 76 of the primary seal 16. Thus, a large flow volume of the brake fluid can flow to a traction control device when the invention is combined with a traction control device and the traction control device forcibly sucks in the brake fluid from the primary side small diameter hydraulic chamber 49 and the secondary side small diameter hydraulic chamber 32.

In the present embodiment, a small diameter hydraulic chamber communication port (communication port) 82, which always communicates with the primary side small diameter hydraulic chamber 49 via the hole portion 50 and the small diameter hydraulic chamber communication flow path 51, a pressurizing chamber communication port 83, which always communicates with the large diameter pressurizing chamber 56 via the pressuring chamber communication flow path 59, and a fluid supply chamber communication port 84, which always communicates with the fluid supply chamber 71, are formed in the first member 21. Additionally, an external communication flow path (communication flow path) 85a comprising an external pipe communicates with the small diameter hydraulic chamber communication port 82, a coupling flow path 85b (first flow path) comprising an external pipe communicates with the pressurizing chamber communication port 83, and a coupling flow path 85c (first flow path) comprising an external pipe communicates with the fluid supply chamber communication port 84.

A brake device 120, such as a disk brake or a drum brake, is connected to the external communication flow path 85a. A hydraulic control unit 121, which is for controlling brake fluid pressure of the master cylinder main body 11 corresponding to depression of the brake pedal and transmitting this to the brake device 120, is disposed at the external communication flow path 85a closer to the master cylinder main body 11 side than the brake device 120. It should be noted that an restrictor 122 is disposed inside the hydraulic control unit 121. The hydraulic control unit 121 is, for example, an ABS unit that determines whether or not the wheels have a tendency to slip during braking and, when the wheels do have a tendency to slip, reduces pressure to a hydraulic pressure that avoids the tendency to slip and transmits the brake fluid pressure to the brake device 120.

A branched flow path (second flow path) 85d communicates with the external communication flow path 85a so as to branch between the master cylinder main body 11 and the hydraulic control unit 121. A control valve 86 that is separate from the master cylinder main body 11 communicates with the branched flow path 85d, the coupling flow path 85b, and the coupling flow path 85c.

The control valve 86 includes a valve cylinder main body 87 that has a bottomed cylinder configuration, a valve piston 88 that is slidably fitted to the inside of the valve cylinder main body 87, a valve spring 89 that is disposed at one end of the valve piston 88 and pushes the valve piston 88 toward a bottom portion 87a of the valve cylinder main body 87, a lid member 90 that closes off an open side of the valve cylinder main body 87 and holds the valve spring 89 between the lid member 90 and the valve piston 88, and a C-ring 91 that fixes the lid member 90 to the valve cylinder main body 87. Further, a valve cylinder 92 is constituted by the valve cylinder main body 87 and the lid member 90.

The valve piston 88 includes a first shaft portion 93 that is formed at a front end thereof, a second shaft portion 94 that is formed adjacent to the first shaft portion 93 and has a diameter that is larger than that of the first shaft portion 93, a third shaft portion 95 that is formed adjacent to the second shaft portion 94 and has a diameter that is smaller than that of the second shaft portion 94, a fourth shaft portion 96 that is formed adjacent to the third shaft portion 95 and has a diameter that is larger than that of the second shaft portion 94, and a fifth shaft portion 97 that is formed adjacent to the fourth shaft portion 96, has a diameter that is smaller than that of the fourth shaft portion 96, and is inserted into the valve spring 89. A seal member 99 is disposed at a front end side of the first shaft portion 93. Further, two O-rings (ring seals) 100 and 101 are disposed at the second shaft portion 94 and the fourth shaft portion 96 of the valve piston 88 to thereby always seal gaps between an inner surface of the valve cylinder main body 87 and the second shaft portion 94 and the fourth shaft portion 96. It should be noted that the two O-rings 100 and 101 may also be disposed at the valve cylinder main body 87 side.

A port 102 that is opened and closed off by the seal member 99 of the valve piston 88 is formed at a bottom portion 87a of the valve cylinder main body 87, and the port 102 communicates with the pressurizing chamber communication port 83 via the coupling flow path (flow path communicating with the large diameter pressurizing chamber 56) 85b. Also, a port 105 that always communicates with a fluid chamber (relief chamber) 104 is formed at the bottom portion 87a side of a side portion 87b of the valve cylinder main body 87. The fluid chamber 104 is surrounded by the valve cylinder main body 87, the first shaft portion 93 and the second shaft portion 94, which form an outer periphery opposite from the valve spring 89 of the valve piston 88, and the seal member 100. The port 105 communicates with the fluid supply chamber communication port 84 via the coupling flow path 85c. Moreover, a port 107 that always communicates with a fluid chamber (pilot chamber) 106 is formed at the side portion 87b of the valve cylinder main body 87. The fluid chamber 106 is surrounded by the valve cylinder main body 87, the second shaft portion 94, the third shaft portion 95 and the fourth shaft portion 96 of the valve piston 88, and the seal members 100 and 101. The port 107 communicates with the external communication flow path 85a via the branched flow path 85d. The seal member 99 of the valve piston 88 and the port 102 of the valve cylinder main body 87 form an open/close valve mechanism 108 that allows and blocks communication between the fluid chamber 104 and the coupling flow path 85b that communicates with the large diameter pressurizing chamber 56.

In the present embodiment, a restrictor 123 is formed in the branched flow path 85d branching from the external communication flow path 85a, which connects the hydraulic control unit 121 and the primary side small diameter hydraulic chamber 49. The restrictor 123 disposed in the branched flow path 85d specifically has a flow path cross-sectional area that has the same circulation resistance as that of the restrictor 122 (the portion that has the smallest flow path cross-sectional area in the flow path within the hydraulic control unit 121 when hydraulic control is inactive) disposed inside the hydraulic control unit 121. Thus, when the pressure in the primary side small diameter hydraulic chamber 49 has risen, the pressure in the brake device 120, which is disposed opposite from the primary side small diameter hydraulic chamber 49 via the restrictor 122 on the flow path, and the pressure in the fluid chamber 106 of the control valve 86, which is disposed opposite from the primary side small diameter hydraulic chamber 49 via the restrictor 123 on the flow path, similarly rise.

The control valve 86 balances the valve piston 88 with the hydraulic pressure in the large diameter pressurizing chamber 56 introduced to the port 102, the hydraulic pressure in the primary side small diameter hydraulic chamber 49 introduced to the fluid chamber 106, and the urging force of the valve spring 89. The balance at this time is represented by the following equation.

Figure 2:
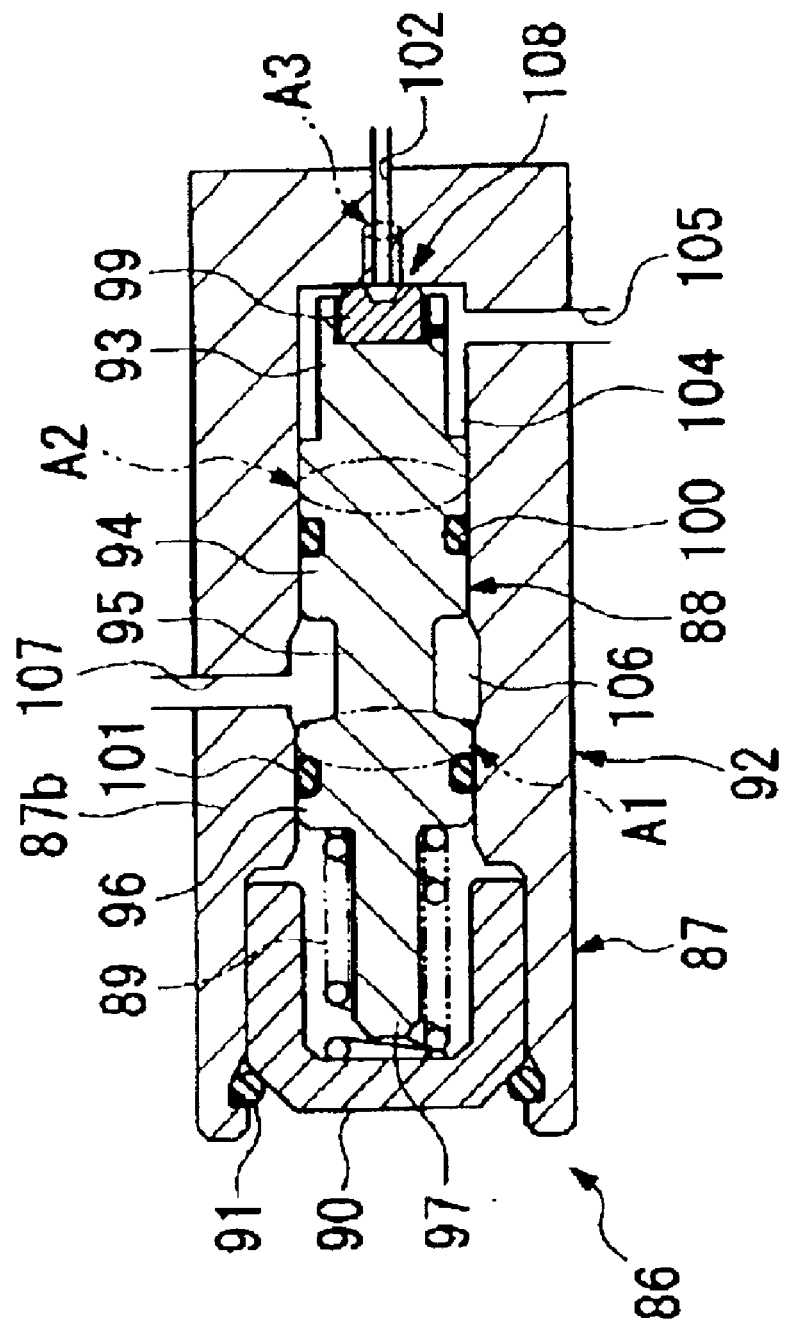
FIG. 2 is a cross-sectional view showing the cross-sectional area of a seal portion of a valve piston of a control valve of the master cylinder of an embodiment of the invention.

That is, as shown in FIG. 2, the following equation is established when A1 represents a cross-sectional area sealed by the O-ring 101, A2 represents a cross-sectional area sealed by the O-ring 100 (wherein A2 is less than A1), A3 represents a cross-sectional area sealed by the seal member 99, Pa represents the hydraulic pressure in the primary side small diameter hydraulic chamber 49, Pb represents the hydraulic pressure in the large diameter pressurizing chamber 56, and F represents a set load of the valve spring 89.

$$Pa \times (A1-A2) + Pb \times A3 = F$$

That is, when F is less than Pa×(A1−A2)+Pb×A3, the control valve 86 opens and the hydraulic pressure in the large diameter pressurizing chamber 56 escapes to the reservoir 12 side. In this manner, when the control valve 86 reaches a fluid-release pressure corresponding to the hydraulic pressure introduced via the branched flow path 85d branching from the external communication flow path 85a, which connects the hydraulic control unit 121 and the primary side small diameter hydraulic chamber 49, the hydraulic pressure in the large diameter pressurizing chamber 56 escapes to the reservoir 12 side.

When the hydraulic pressure in the large diameter pressurizing chamber 56 begins to rise during the initial stage of brake actuation, the hydraulic pressure in the primary side small diameter hydraulic chamber 49 also increases at the same pressure as the hydraulic pressure in the large diameter pressuring chamber 56 by the cup seal 61 being opened. At this time, the hydraulic pressure in the brake device 120, which communicates with the primary side small diameter hydraulic chamber 49 via the restrictor 122 of the hydraulic control unit 121, and the hydraulic pressure in the control valve 86, which communicates with the primary side small diameter hydraulic chamber 49 via the restrictor 123, similarly rise due to both of the restrictors 122 and 123, whereby so-called fast filling, in which a large amount of brake fluid that compensates for the ineffective fluid amount during the initial stage of the stroke is supplied to the brake device 120, is conducted well. In other words, even if the hydraulic pressure in the primary side small diameter hydraulic chamber 49 rises due to the restrictor 122 of the hydraulic control unit 121, the hydraulic pressure in the fluid chamber 106 is prevented from rising by the restrictor 123 before brake fluid is supplied to the brake device 120, to thereby prevent F from soon becoming less than Pa×(A1−A2)+Pb×A3 and the control valve 86 from opening.

Additionally, when the brake fluid that compensates for the ineffective fluid amount during the initial stage of the stroke is supplied to the brake device 120 and F becomes less than Pa×(A1−A2)+Pb×A3, the valve piston 88 of the control valve 86 slightly moves counter to the urging force of the valve spring 89, to thereby open the port 102 by a small amount and cause the hydraulic pressure in the large diameter pressurizing chamber 56 to begin being released. At this time, the hydraulic pressure Pb in the large diameter pressurizing chamber 56 escapes to the reservoir 12 side via the fluid supply chamber 71 such that the hydraulic pressure Pb in the large diameter pressurizing chamber 56 is gradually lowered in accordance with the rise of the hydraulic pressure Pa in the primary side small diameter hydraulic chamber 49 to satisfy the equation of Pa×(A1−A2)+Pb×A3=F, i.e., so that the hydraulic pressure Pb in the large diameter pressurizing chamber 56 is lowered in correlation with the rise of the hydraulic pressure in the primary side small diameter hydraulic chamber 49 in accordance with the following equation:

$$Pb = (F - Pa \times (A1-A2)) \div A3.$$

At the time of high pressurization, that is, at an operating time at which the brake pedal is depressed at a comparatively fast speed, the input from the brake booster linearly rises and the hydraulic pressure Pa in the primary side small diameter hydraulic chamber 49 rises at a constant rate. Thus, the control valve 86 allows the hydraulic pressure Pb of the large diameter pressurizing chamber 56 to escape to the reservoir 12 side so that the hydraulic pressure Pb is gradually lowered along a set slope. The slope can be arbitrarily set and tuned to match the vehicle.

Because the control valve 86 maintains an opened to state when the balance equation becomes Pa×(A1−A2)>F, the hydraulic pressure in the large diameter pressurizing chamber 56 is released and becomes atmospheric pressure, and brake fluid pressure is controlled only by the primary side small diameter hydraulic chamber 49.

Next, the action of the master cylinder of the above embodiment will be described.

When the brake pedal is depressed by the driver and the primary piston 16 is pushed in the direction of the bottom portion 15a by a negative pressure booster coupled with the brake pedal, the secondary piston 17 also moves at the same time via the primary piston spring 68. The hydraulic pressure in the large diameter pressurizing chamber 56 rises at the point in time that the relief port 58 of the primary piston 16 is closed off by the cup seal 61, and the hydraulic pressure in the secondary side small diameter hydraulic chamber 32 rises at the point in time that the relief port 35 of the secondary piston 17 is closed off by the cup seal 36. The hydraulic pressure in the primary side small diameter hydraulic chamber 49 increases at point in time that one of the relief ports 58 and 76 closes (in terms of design, the relief ports 58 and 76 are closed off at the same time, but sometimes one closes before the other due to dimensional irregularity or the like).

When the hydraulic pressure rises, in regard to the primary side small diameter hydraulic chamber 49, a fluid amount of a stroke amount of the primary piston 16 multiplied by (the outer diameter of the primary side small diameter hydraulic chamber 49 subtracted from the outer diameter of the large diameter pressurizing chamber 56), presses and open the cup seal 61, and flows from the large diameter pressurizing chamber 56 to the primary side small diameter hydraulic chamber 49 to compensate for the ineffective fluid amount (mainly amount of caliper rollback) at the initial stage of the stroke. Thereafter, the brake fluid is sent from the large diameter pressurizing chamber 56 to the primary side small diameter hydraulic chamber 49, and the hydraulic pressure in the large diameter pressurizing chamber 56 and the hydraulic pressure in the primary side small diameter hydraulic chamber 49 rise at the same pressure until they reach the pressurizing chamber fluid-release pressure, to compensate for the insufficient fluid amount accompanying the reduction in the diameter of the primary side small diameter hydraulic chamber 49.

When the hydraulic pressure rises to the pressurizing chamber fluid-release pressure, the control valve 86, which had been in a closed state until then, releases the hydraulic pressure of the large diameter pressurizing chamber 56. At this time, as described above, the control vale 86 allows the hydraulic pressure Pb of the large diameter pressurizing chamber 56 to escape to the reservoir 12 side via the fluid supply chamber 71 so that the hydraulic pressure Pb of the large diameter pressurizing chamber 56 is gradually lowered in accordance with the rise in the hydraulic pressure Pa in the primary side small diameter hydraulic chamber 49.

When the hydraulic pressure of the large diameter pressurizing chamber 56 is released and becomes atmospheric pressure, the control valve 86 maintains the opened state and the brake fluid pressure is controlled only by the primary side small diameter hydraulic chamber 49.

According to the master cylinder 1 of the present embodiment described above, when the cup seal 61 is opened and the fluid is about to be supplied from the large diameter pressurizing chamber 56 side to the primary side small diameter hydraulic chamber 49 side in order to compensate for the ineffective fluid amount during the initial stage of the stroke, even if the hydraulic pressures in the external communication flow path 85a, which connects the hydraulic control unit 121 and the primary side small diameter hydraulic chamber 49, and in the branched flow path 85d that branches from the external communication flow path 85a suddenly rise due to the restrictor 122 of the hydraulic control unit 121, the restrictor 123 disposed in the branched flow path 85d prevents the hydraulic pressure in the fluid chamber 106 of the control valve 86 from suddenly rising at the time of sudden braking and reaching a set valve-opening pressure, and prevents the control valve 86 from opening. Therefore, even if the hydraulic control unit 121 is disposed between the master cylinder main body 11 and the brake device 120, the ineffective fluid amount during the initial stage of the stroke can be sufficiently compensated for. As a result, extension of the pedal stroke can be prevented, and it becomes possible to obtain a stable pedal feel.

Moreover, because the restrictor 123 of the branched flow path 85d has the flow path cross-sectional area having a circulation resistance that is the same as that of the restrictor 122 disposed in the hydraulic control unit 121, even if the hydraulic pressure in the branched flow path 85d suddenly rises during sudden braking due to the restrictor 122 of the hydraulic control unit 121, the restrictor 123 disposed in the branched flow path 85d reliably prevents the hydraulic pressure in the fluid chamber 106 from suddenly rising and reaching a set valve-opening pressure, and prevents the control valve 86 from opening. Therefore, even if the hydraulic control unit 121 is disposed between the master cylinder main body 11 and the brake device 120, the ineffective fluid amount during the initial stage of the stroke can be sufficiently and reliably compensated for.

Figure 3:
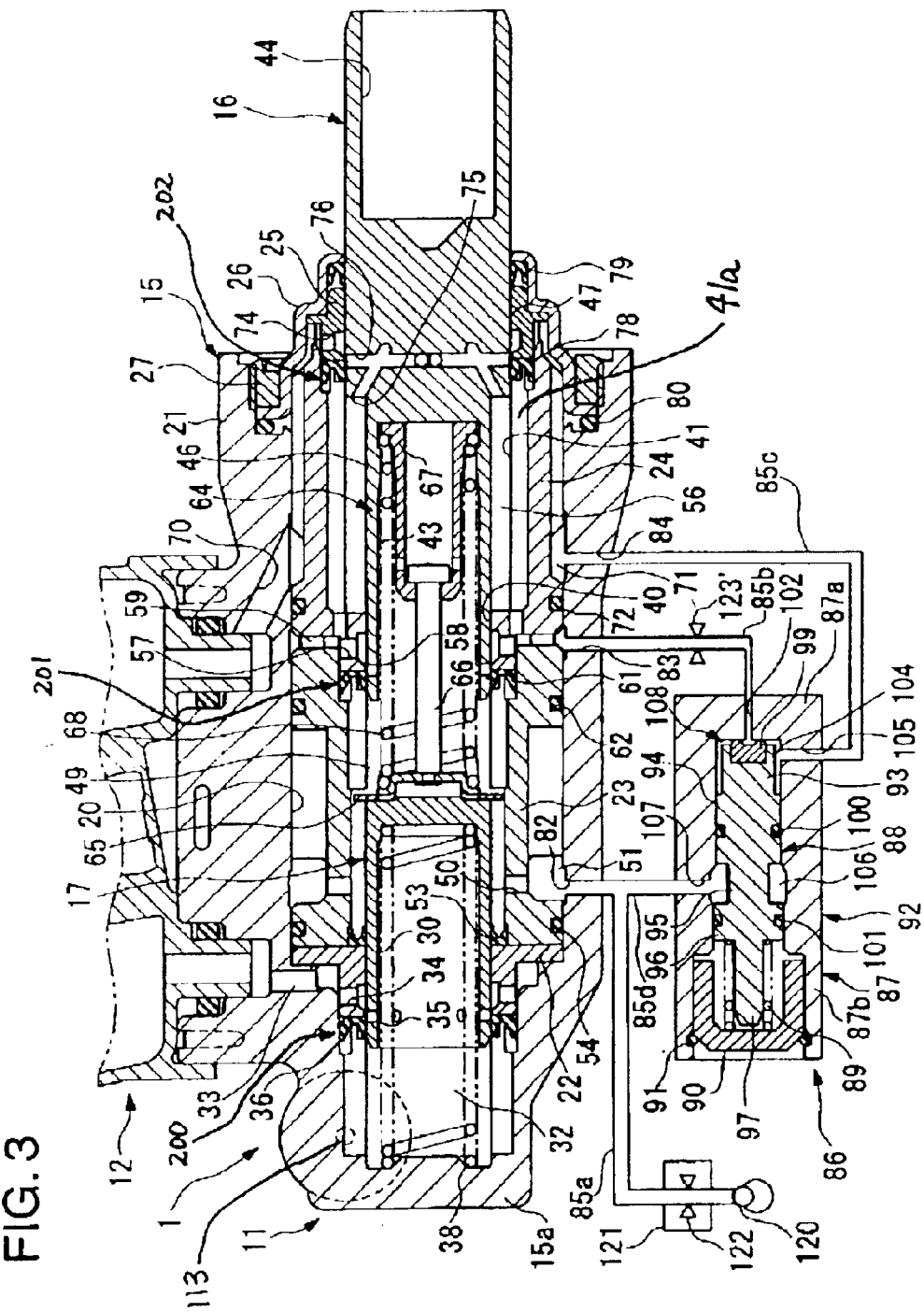
FIG. 3 is a side cross-sectional view showing another example of the structure of the master cylinder of another embodiment of the invention.

As illustrated in FIG. 3, the same effects as those described above can also be obtained by disposing a restrictor 123', which is the same as that described above, in the coupling flow path 85b.

In the master cylinder of the above-described embodiment, an example was described in which the inside of the stepped cylinder 15 is partitioned into the large diameter pressurizing chamber 56 of the large diameter piston portion 47 side and the primary side small diameter hydraulic chamber 49 of the small diameter piston portion 46 side, and in which the cup seal 61 is disposed so that only flow of the brake fluid from the large diameter pressurizing chamber 56 to the primary side small diameter hydraulic chamber 49 is permitted. However, the invention is not limited to the same. A sealing check valve (open/close check portion) may also be disposed in place of the cup seal 61.

Additionally, although the open/close valve mechanism 108 in the above-described embodiment is structured to receive the pressure of the coupling flow path 85b and open, a spool valve that is not effected by the coupling flow path 85b may also be used.

Moreover, although the fluid chamber 106 in the above-described embodiment is connected to the primary side small diameter hydraulic chamber 49 by the branched flow path 85d that branches from the external communication flow path 85a, the invention is not limited to the same. The fluid chamber 106 may also be directly connected to the primary side small diameter hydraulic chamber 49 without the intervention of the external communication flow path 85a.

As described above, according to the master cylinder of the invention, when the check/open close portion is opened and the fluid is about to be supplied from the pressurizing chamber to the hydraulic chamber in order to compensate for the ineffective fluid amount during the initial stage of the stroke at the time of sudden braking, even if the hydraulic pressures in the communication flow path, which connects the hydraulic control unit and the hydraulic chamber, and in the second flow path suddenly rise due to the restrictor of the hydraulic control unit, the restrictor disposed in the second flow path prevents the hydraulic pressure in the control valve from suddenly rising, reaching a set valve-opening pressure, and opening the control valve. Therefore, even if the hydraulic control unit is disposed between the master cylinder and the brake device, the ineffective fluid amount during the initial stage of the stroke can be sufficiently compensated for. As a result, extension of the pedal stroke can be prevented, and it becomes possible to obtain a stable pedal feel.

Also, according to the master cylinder of the invention, because the restrictor of the second flow path has the flow path cross-sectional area having a circulation resistance that is the same as that within the hydraulic control unit, changes in the pressure of the pilot chamber and the pressure of the brake device become substantially identical, and effects resulting from the manner of depression of the brake pedal of the opening of the control valve are made smaller.

According to another embodiment of the master cylinder of the invention, when the check/open close portion is opened and the fluid is about to be supplied from the pressurizing chamber to the hydraulic chamber in order to compensate for the ineffective fluid amount during the initial stage of the stroke at the time of sudden braking, even if the hydraulic pressures in the communication flow path, which connects the hydraulic control unit and the hydraulic chamber, and in the second flow path suddenly rise due to the restrictor of the hydraulic control unit, the restrictor disposed in the first flow path upstream of the control valve prevents the hydraulic pressure in the control valve from suddenly rising, reaching a set valve-opening pressure, and opening the control valve. Therefore, even if the hydraulic control unit is disposed between the master cylinder and the brake device, the ineffective fluid amount during the initial stage of the stroke can be sufficiently compensated for. As a result, extension of the pedal stroke can be prevented, and it becomes possible to obtain a stable pedal feel.

Also, according to the master cylinder of the other embodiment of the invention, because the restrictor of the first flow path has the flow path cross-sectional area having a circulation resistance that is the same as that within the hydraulic control unit, changes in the pressure of the pilot chamber and the pressure of the brake device become substantially identical, and effects resulting from the manner in which the brake pedal of the opening of the control valve are made smaller.

What is claimed is:

1. A master cylinder comprising:
   a first cylinder portion and a second cylinder portion;
   a first piston portion that is slidably inserted into the first cylinder portion;
   a second piston portion that is slidably inserted into the second cylinder portion;
   a pressurizing chamber that is caused to expand and contract by the sliding of the first piston portion;
   a hydraulic chamber that is caused to expand and contract by the sliding of the second piston portion and communicates with a brake device via a hydraulic control unit;

an open/close check portion that partitions the pressurizing chamber and the hydraulic chamber and permits flow of brake fluid only from the pressurizing chamber side to the hydraulic chamber side;

a first flow path that communicates the pressurizing chamber and a reservoir;

a control valve that includes a pilot chamber and switches the first flow path from a blocked state to a communicable state when pressure inside the pilot chamber reaches a predetermined fluid-release pressure;

a second flow path that communicates the pilot chamber and the hydraulic chamber; and a restrictor disposed in the second flow path.

2. The master cylinder of claim 1, wherein the restrictor of the second flow path has a flow path cross-sectional area having circulation resistance that is the same as circulation resistance inside the hydraulic control unit.

3. A master cylinder comprising:

a first cylinder portion and a second cylinder portion;

a first piston portion that is slidably inserted into the first cylinder portion;

a second piston portion that is slidably inserted into the second cylinder portion;

a pressurizing chamber that is caused to expand and contract by the sliding of the first piston portion;

a hydraulic chamber that is caused to expand and contract by the sliding of the second piston portion and communicates with a brake device via a hydraulic control unit;

an open/close check portion that partitions the pressurizing chamber and the hydraulic chamber and permits flow of brake fluid only from the pressurizing chamber side to the hydraulic chamber side;

a first flow path that communicates the pressurizing chamber and a reservoir;

a control valve that includes a pilot chamber and switches the first flow path from a blocked state to a communicable state when pressure inside the pilot chamber reaches a predetermined fluid-release pressure;

a second flow path that communicates the pilot chamber and the hydraulic chamber; and a restrictor disposed in the first flow path upstream of the control valve.

4. The master cylinder of claim 3, wherein the restrictor disposed in the first flow path upstream of the control valve has a flow path cross-sectional area having circulation resistance that is the same as circulation resistance inside the hydraulic control unit.

* * * * *